Dec. 29, 1964 E. J. SCHAEFER 3,163,810
MULTISPEED ELECTRIC MOTORS
Filed May 1, 1961 2 Sheets-Sheet 1
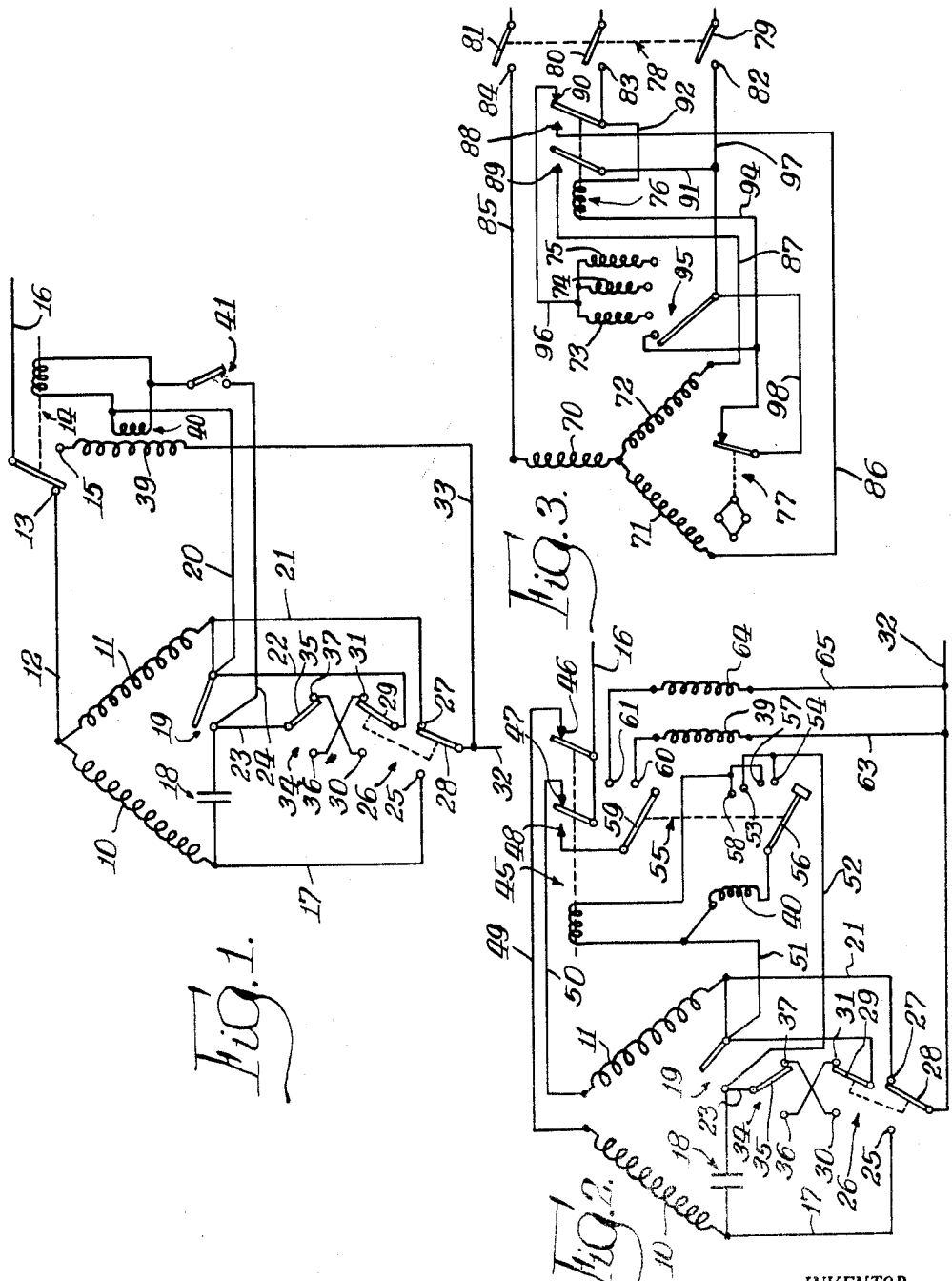
INVENTOR.
Edward J. Schaefer,
BY
Davis, Lindsey, Hibben & Noyes
Atty's.

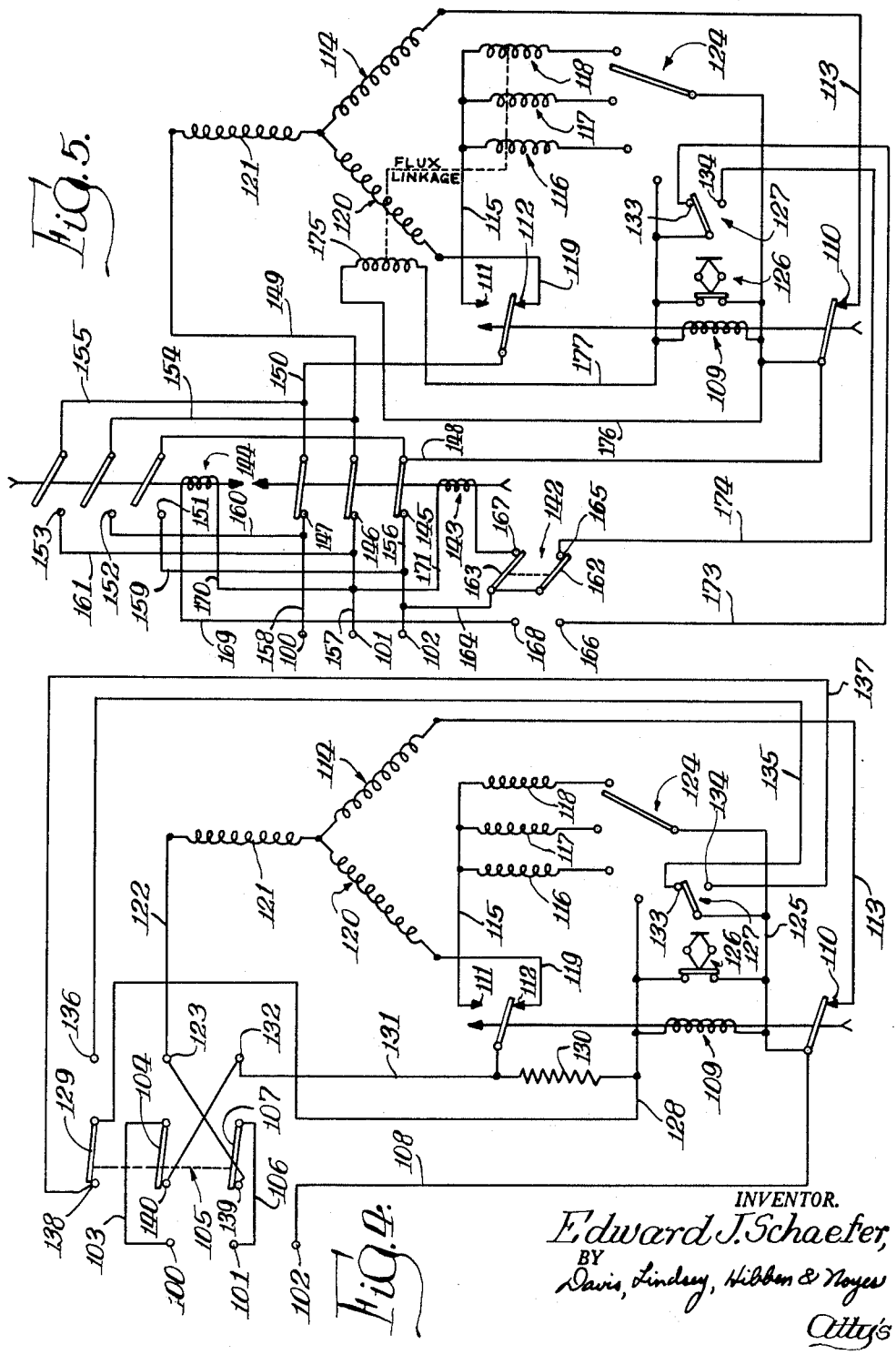

United States Patent Office 3,163,810
Patented Dec. 29, 1964

3,163,810
MULTISPEED ELECTRIC MOTORS
Edward J. Schaefer, Bluffton, Ind., assignor to Franklin Electric Co., Inc., Bluffton, Ind., a corporation of Indiana
Filed May 1, 1961, Ser. No. 115,842
20 Claims. (Cl. 318—203)

This invention relates to improvements in multispeed electric motors and more particularly to multispeed motors of either the single phase or multiphase type.

The primary object of the present invention is to provide a novel multispeed motor having a simple arrangement for shifting from operation at one speed to operation at a different speed.

A further object is to provide a novel multispeed motor of the foregoing character, which is shifted, when manually set, from operation at the one speed to operation at the different speed in response to the speed of operation.

Another object is to provide a novel multispeed motor which may be instantly reversed to operate at either speed in either direction.

Other objects and advantages of the inventon will become evident from the subsequent detailed description taken in conjunction with the accompanying drawings wherein:

FIG. 1 is a schematic diagram of a single phase motor embodying the features of the invention and having instantly reversing means;

FIG. 2 is a schematic circuit diagram of another embodiment of a single phase multispeed motor having a reversing arrangement;

FIG. 3 is a schematic circuit diagram of a multispeed polyphase motor embodying the features of the invention;

FIG. 4 is a schematic circuit diagram of another embodiment of a multispeed polyphase motor and having a reversing arrangement; and FIG. 5 is a schematic circuit diagram of still another embodiment of a multispeed polyphase motor with a reversing arrangement.

In each embodiment of the present invention, main windings are provided for operating the motor at one speed and one or more auxiliary windings for operating the motor at different speeds. The main windings are used for developing the starting or reversing torque and, if the motor is to be operated at a different speed from that provided by the main windings, a centrifugal or speed responsive switch functioning at a predetermined speed causes a shifting to the selected one of the auxiliary windings.

A relay controlling the connection of the auxiliary winding is provided and is rendered operable manually. The centrifugal switch is arranged to open upon reaching a predetermined speed and cause the relay to operate to shift from the main windings to the auxiliary windings.

In the split phase motor of FIG. 1, a single auxiliary winding is provided for the second speed. This motor is further provided with an instantly reversing feature by which the same pair of main windings are used to develop the starting torque irrespective of the direction of operation of the motor. The embodiment of FIG. 2 differs primarily from that of FIG. 1 in that two auxiliary windings are provided so that selectively the motor may be run at any one of three different speeds in either direction. The embodiments of FIGS. 3, 4 and 5 are all of polyphase motors with three auxiliary windings for enabling selective operation of each motor at four different speeds. The embodiments of FIGS. 4 and 5 are additionally provided with an instantly reversing function. In the embodiments of FIGS. 1, 2, 4 and 5, the relay is adapted to be energized to effect control of the auxiliary winding or windings, while in the embodiments of FIG. 3 the operation of the relay which connects the auxiliary windings is a deenergization thereof.

The reversing feature shown in certain of the figures is substantially that shown in my U.S. Patent No. 2,847,629, issued August 12, 1958.

It is to be understood that the motors of each of the embodiments include a rotor of the squirrel cage type and that each of the windings thereof both main and auxiliary may be arranged in any desired number of poles. For example, the main windings may be each wound as two poles to provide high speed operation of the motor, with auxiliary winding being wound as four poles to provide operation at a lower speed, or the opposite arrangement might be provided to effect higher speed operation with the auxiliary windings.

In FIG. 1 the main windings are indicated at 10 and 11 and are connected at one end to each other and to one end of a conductor 12. The other end of the conductor 12 is connected to a contact 13 of a relay 14. The armature of relay 14 carries a contact engaging contact 13 when relay 14 is deenergized and engaging a contact 15 when relay 14 is energized. The contact carried by the armature of relay 14 is connected to a line connector 16. The other end of winding 10 is connected to one end of conductor 17 and one side of a phase splitting condenser 18. The other side of condenser 18 is connected to one side of a centrifugal switch 19, and the other side of centrifugal switch 19 is connected to the other end of winding 11. Said other end of winding 11 is also connected in parallel to one end of each of conductors 21 and 22. The side of the switch 19 which is connected to condenser 18 is also connected in parallel to one end of a conductor 23. Conductor 17 is connected to a contact 25 of a double-pole double-throw switch indicated generally at 26, and conductor 21 is connected to a contact 27 of switch 26.

Switch 26 is provided for reversing the direction of rotation of the motor and is adapted to be manually operated. Thus, the switch 26 includes a pole 28 which is alternatively movable to engage contacts 25 and 27. The switch 26 also includes a pole 29 which is movable to respectively engage a pair of contacts 30 and 31. Pole 28 is connected in parallel to the other line conductor indicated at 32. Pole 29 is connected to the other end of conductor 22. A motor direction sensing switch, indicated generally at 34, is also provided, and comprises a pole 35 and contacts 36 and 37. Contact 36 of switch 34 is connected by a conductor to contact 31 of switch 26, and contact 37 of switch 34 is connected by a conductor to contact 30 of switch 26. The pole 35 of switch 34 is connected to conductor 23.

The foregoing arrangement is substantially that shown in my prior Patent No. 2,847,629.

As heretofore indicated, the present invention provides for operation of the motor at a speed differing from that provided by the windings 10 and 11, the different speed being either higher or lower than that provided by the windings 10 and 11. To this end, a conductor 33 is connected to line conductor 32 and to one end of an auxiliary winding 39. The other end of the auxiliary winding 39 is connected to relay contact 15. A relatively small coil 40 for energizing the coil of relay 14 is inductively coupled to winding 39 so that a voltage may be developed thereacross when current is flowing in winding 39. Coil 40 is connected across the coil of relay 14. A conductor 20 is also provided and is connected at one end to one side of the coil of relay 14 and to one side of the coil 40 and at its other end to one side of centrifugal switch 19. A conductor 24 connects the other side of the coil of relay 14 and the coil 40 to the other side of the centrifugal switch 19. The conductor 24 includes a manually operable switch 41 therein.

In the operation of the embodiment of FIG. 1, assume that switch 41 is open, that switch 34 is positioned so that pole 35 engages conact 37, and that switch 26 is operated so that poles 28 and 29 respectively engage contacts 27 and 31. With the motor stopped, centrifugal switch 19 will be closed, and with relay 14 deenergized contact 13 will be connected to the line conductor 16. The following circuit is then completed: from line conductor 16 through contact 13, conductor 12, in parallel through winding 11 to conductor 21 and through winding 10, condenser 18, centrifugal switch 19 to conductor 21, and from conductor 21 to contact 27, pole 28 to line conductor 32. The motor will begin to operate from windings 10 and 11 with the phase therebetween being split by condenser 18. When the motor reaches the predetermined speed for which the centrifugal switch 19 has been set to open, which is the speed for running from winding 11, switch 19 will open to remove winding 10 from the previously described circuit, and the motor will continue to run at the speed provided by winding 11 since the switch 41 is open. Assume next that the switch 26 is manually operated to its other position with poles 28 and 29 respectively engaging contacts 25 and 30, for reversing the direction of the motor, and that the switch 41 is still open. The existing running circuit will then be broken at contact 27 and two different circuits will thereby be completed. One may be traced as follows: from line conductor 16 through contact 13, conductor 12, winding 10, conductor 17, contact 25, pole 28, to line conductor 32. The other circuit will be as follows: from line conductor 16, contact 13, conductor 12, winding 11, conductor 22 (since centrifugal switch 19 is still open), pole 29, contact 30, contact 37, pole 35, conductor 23, condenser 18, conductor 17, contact 25, pole 28, to line conductor 32. These circuits will apply a negative or reverse torque upon the rotor of the motor and the motor will begin to slow down.

When the motor reaches the speed for which centrifugal switch 19 is set to close, that switch will close its contacts. The motor will then come to a stop and begin operaion in a reverse direction. Upon the reverse operation of the motor, the direction sensing switch 34 will operate to move pole 35 to engage contact 36. The described circuit energizing winding 10 will remain. However, the following circuit will now be completed for winding 11: line conductor 16 through contact 13, conductor 12, winding 11, centrifugal switch 19, condenser 18, conductor 17, contact 25, pole 28, to line conductor 32. As the motor reaches the speed in the reverse direction for which centrifugal switch 19 is set to open, that switch will open to break the circuit for winding 11 and the motor will then be maintained at a running speed as determined by winding 10. The motor may again be caused to reverse its direction of rotation by merely again returning switch 26 to the operated position wherein poles 28 and 29 respectively engage contacts 27 and 31 and the motor will operate in the first described direction at a speed determined by winding 11.

Returning to the first described operated position of switches 26 and 34, but assuming that switch 41 is now closed, it may be seen that, with the motor stopped and centrifugal switch 19 closed, a shunt circuit is completed across the coil of relay 14 and the coil 40, preventing any voltage from being developed thereacross. The motor will again begin operation from windings 10 and 11 and, when the speed is reached for which centrifugal switch 19 is set to open, winding 10 will be disconnected as a starting winding and the shunt across the coil of relay 14 will be removed. Relay 14 will then be energized over the following circuit: from line conductor 16, relay contact 13, conductor 12, winding 10, condenser 18, conductor 24, switch 41, the coil of relay 14, conductor 20, conductor 21, contact 27, pole 28, to line conductor 32.

Relay 14 upon the energization thereof will break the connection of line conductor 16 with contact 13 and move the connection of the line conductor 16 to contact 15. Winding 39 will then be energized over the following circuit: Line conductor 16 through contact 15, winding 39, conductor 33 to line conductor 32. The circuit for winding 11 is thus broken and winding 39 is established as the running winding. Because of the flux linkage between winding 39 and coil 40, a current will be induced in coil 40 by winding 39 to hold relay 14 energized. The motor will thus continue to operate at the speed determined by winding 39.

To operate the motor at the speed determined by the winding 39 but in the reverse direction, the switch 26 is operated to move the poles 28 and 29 to respectively engage contacts 25 and 30. The following shunt circuit will then be connected across coil 40: from one side of coil 40 through conductor 20, conductor 22, pole 29, contact 30, contact 37, pole 35, conductor 23, conductor 24, switch 41, to the other side of coil 40. The voltage developed across the coil 40 and the coil of relay 14 will collapse and relay 14 will be deenergized to again establish connection of the line conductor 16 with contact 13 and break the connection thereof with winding 39. The previously described circuits developing the negative or reverse torque will be re-established and the motor will begin to slow down.

The next action will be a closing of the centrifugal switch 19 followed then by a stopping of the motor and a restarting in the reverse direction. Upon the starting of the motor in the reverse direction, direction sensing switch 34 will operate to move pole 35 to engage contact 36, and will remove the previously described shunt across coil 40 through the switch 34. The coil of relay 14, however, will not be energized at this time because of the closed condition of centrifugal switch 19. As the motor, under the influence of windings 10 and 11 reaches the speed in the reverse direction for which centrifugal switch 19 is set to open, that switch will open, removing winding 11 as a starting winding and again removing the shunt across the coil of relay 14 effected by the centrifugal switch 19. Relay 14 will then be energized over the following circuit: from line conductor 16, relay contact 13, conductor 12, winding 11, conductor 20, the coil of relay 14, switch 41, conductor 24, condenser 18, conductor 17, contact 25, pole 28, to line conductor 32. Relay 14 will operate to switch the line conductor 16 from contact 13 and winding 10 to contact 15 and winding 39. The motor will thus operate in the reverse direction at a speed determined by the winding 39.

From the foregoing, it may be seen that the winding 39 is never used as a starting winding, and the windings 10 and 11 furnish the starting torques for forward and reverse directions. The cut-out speed of the centrifugal switch 19 is preferably set for the normal value for the high speed running winding. If winding 39 is designed for a speed substantially lower than the cut-out speed of the centrifugal switch, the centrifugal switch 19 may be provided with a high differential so that it closes at a lower speed than that at which it opens. It thus will remain in the open position until the running speed has decreased to well under the running speed of the low speed winding before it closes.

In the embodiment shown in FIG. 2, the various elements thereof are substantially the same as the corresponding elements previously described in reference to FIG. 1 and will be designated with the same reference characters. Basically the embodiment of FIG. 2 differs from the first embodiment by the addition of another auxiliary running winding and the manner in which the relay for shifting the windings is energized. It will be seen from the description that, while two auxiliary windings are shown, any number of additional auxiliary running windings may be added. The relay in FIG. 2 is indicated at 45 and its armature carries two contacts connected to line conductor 16, one contact engaging a contact 46 and the other contact engaging a contact 47 when relay 45 is deenergized. When relay 45 is energized, the connection of line conductor 16 to contacts 46 and 47 is broken and line conductor 16 is then connected to a contact 48. Contact 46 is connected through a conductor 49 to one end of winding 10, and contact 47 is connected through conductor 50 to one end of winding 11. The other ends of windings 10 and 11 are connected as in the first described embodiment to condenser 18, centrifugal switch 19, direction sensing switch 34, and reversing switch 26. Replacing conductor 20 of the first embodiment is a conductor 51 which is connected in parallel to one end of coil 40 and one side of the coil of relay 45. Replacing conductor 24 of the first embodiment is a conductor 52 which is connected in parallel to contacts 53 and 54 of a switch 55. Switch 55 is a manually operated two pole three position switch. In the first position of the switch, neither of its poles engages any contact. One pole 56, however, carries a shorting contact so that in the second position of the switch 55 the switch contacts 54 and 57 are connected to each other and both are connected to pole 56, and in the third position contacts 53 and 58 are connected to each other and both are connected to the pole 56. Pole 56 is connected to the coil 40, and contacts 57 and 58 are connected in parallel to the coil of relay 45. Thus, when the switch 55 is in its second or third positions, the coil 40 and the coil of the relay 45 are connected to the conductors 51 and 52. The second pole of switch 55, indicated at 59, is adapted to engage a contact 60 in the second position of the switch and a contact 61 in the third position. Contact 60 is connected to one end of the auxiliary winding 39, and the other end of auxiliary winding 39 is connected by conductor 63 to line conductor 32. Contact 61 is connected to one end of the auxiliary winding 64 and the other end of winding 64 is connected by conductor 65 to line conductor 32. Coil 40 is inductively coupled to windings 10, 11, 39 and 64.

Since much of the embodiment of FIG. 2 operates as that of FIG. 1, it is believed only necessary herein to describe the differences in operation. Assuming that the switch 55 is in the first position, with the poles 56 and 59 engaging no contact, and assuming that the switches 26 and 34 are conditioned as shown in FIG. 2, no current will flow through coil 40 or the coil of relay 45 since any circuit for coil 40 is open at pole 56 and any circuit for the coil of relay 45 is open at contacts 57 and 58. The windings 10 and 11 are then connected as starting windings and upon the motor reaching the running speed, centrifugal switch 19 will open to disconnect winding 10 with the motor operating from winding 11 at the running speed determined by the winding 11. If switch 26 is operated to the position wherein poles 28 and 29 engage contacts 25 and 30, the motor will reverse in direction and will operate from winding 10 as the running winding with winding 11 being disconnected.

Assuming that switch 55 is in the second position, with pole 56 engaging contacts 54 and 57 and pole 59 engaging contact 60, the centrifugal switch 19 being closed when starting, the motor short circuits the coil of the relay 45 and the motor thus starts on windings 10 and 11. When the centrifugal switch opens, the following circuit is completed for energization of relay 45: from one side of centrifugal switch 19 through conductor 51 to one side of the coil of relay 45, from the other side of the relay coil, contact 57, contact 54 to the other side of the centrifugal switch 19. Also, the coil 40, being inductively coupled to windings 10, 11, 39 and 64, and connected across the coils of relay 45, will energize the relay coil when the centrifugal switch 19 is open. When relay 45 is energized, the line conductor 16 is disconnected from contacts 46 and 47 and the windings 10 and 11, and the line conductor 16 is connected to contact 48 and hence through pole 59 and contact 60 to winding 39. The motor will then operate from auxiliary winding 39 at the level of running speed determined by the winding 39.

When the switch 55 is operated to the third position, it may be seen from the foregoing description that the motor will operate at its third running speed from the auxiliary winding 64 which will be connected to line conductor 16 by contact 48, pole 59 and contact with contact 61. At any time when the motor is operating at a running speed from one of the windings 39 or 64, an operation of the switch 26 to reverse the direction of rotation of the motor will apply a shunt across coil 40 in place of the centrifugal switch 19. Thus as in the embodiment of FIG. 1, the windings 10 and 11 will serve to supply the negative or reverse torque without switching to one of the auxiliary windings 39 or 64 until the motor again reaches the running speed in the reverse direction. When either auxiliary winding 39 or 64 is connected as a running winding, the flux linkage between windings 39 and 64 and coil 40 will hold relay 45 energized.

In the embodiment shown in FIG. 3, the motor is a polyphase motor having three phase main windings 70, 71 and 72 for starting and running at one speed. Auxiliary windings 73, 74 and 75 are provided for operation of the motor as a single phase motor at three different running speeds. A relay 76 and a centrifugal or speed responsive switch 77 are again used to shift the motor from the main windings to the auxiliary windings. A motor starting switch 78 is provided and comprises three poles 79, 80 and 81 having a single throw. Each of the poles 79, 80 and 81 is connected to one line conductor of a three phase power line. In the closing of switch 78, pole 79 will connect one line conductor to contact 82, pole 80 will connect the second line conductor to contact 83 and pole 81 will connect the third line conductor to contact 84. Contact 84 is connected by conductor 85 to one end of winding 70. The other end of winding 70 is connected to one end of each of windings 71 and 72 in the usual manner. The other end of winding 71 is connected to one end of a conductor 86, and the other end of winding 72 is connected to one end of a conductor 87. The other end of conductor 86 is connected to a relay contact 88, and the other end of conductor 87 is connected to a relay contact 89. In addition to contacts 88 and 89, relay 76 also is provided with a contact 90. The armature of relay 76 carries two electrically separate contacts, one of which is connected to one end of a conductor 91, and the other of which is connected to contact 83 of switch 78 and to one side of the coil of relay 76 through conductor 92. When relay 76 is deenergized, contact 90 is thus connected to contact 83 and conductor 92. When relay 76 is energized, the contact 83 and conductor 92 are shifted from relay contact 90 to engagement with contact 88, and conductor 91 is connected to relay contact 89. The other side of the coil of relay 76 is connected to one end of a conductor 94 and the other end of conductor 94 is connected to the contact of centrifugal switch 77 and the first contact of a single-pole four-position switch 95. One end of an auxiliary winding 73 is connected to the second contact of switch 95, one end of a second auxiliary winding 74 is connected to the third contact of the switch 95, and one end of a third auxiliary winding 75 is connected to the fourth contact of switch 95. The other ends of the auxiliary windings 73, 74 and 75 are all connected to one end of a conductor 96, the other end of which is connected to relay contact 90. A conductor 97 interconnects contact 82 of switch 78, conductor 91 and the pole of switch 95. The pole of switch 95 is also connected to the pole of the centrifugal switch 77 by a conductor 98.

In the operation of the embodiment of FIG. 3, it is first assumed that the switch 78 is operated to close its contacts and that switch 95 is in the first position. The following circuit for the energization of relay 76 is completed: from pole 80, contact 83, conductor 92, the coil of relay 76, conductor 94, the contact for the first position of switch 95, the pole of switch 95, conductor 97, contact 82 to pole 79. An alternate circuit including centrifugal switch 77 may be traced for the energization of relay 76. However, that circuit is unimportant so long as the switch 95 is positioned in its first position. Relay 76 upon energization will complete two circuits for connection of the windings 71 and 72 to the line conductors. The first of these circuits may be traced as follows: from pole 80, contact 83, relay contact 88, conductor 86, to winding 71. The other circuit may be traced from pole 79, contact 82, conductor 97, conductor 91, relay contact 89, conductor 87 to winding 72. Winding 70 is connected to the third line conductor over an obvious circuit upon the initial closing of switch 78. The motor will then operate as a conventional polyphase motor from the three windings 70, 71 and 72. Since the centrifugal switch 77 is not in any of these circuits, it will have no effect on the operation of the motor when the switch 95 is set at its first position.

For operation of the motor when the switch 95 has been moved to the second position, with the pole of the switch 95 engaging winding 73, the previously described circuit for the energization of relay 76 is opened. However, the relay 76 is then energized over the following circuit: pole 80, contact 83, conductor 92, the coil of relay 76, conductor 94, centrifugal switch 77, conductor 98, conductor 97, contact 82, to pole 79. Relay 76 when energized will complete the previously described circuits for windings 71 and 72 so that as previously described the motor will begin operation as a polyphase motor from the three windings 70, 71 and 72.

When the motor reaches the speed for which the centrifugal switch 77 has been set to open, that switch will open, breaking the described circuit for the energization of relay 76. Relay 76 on being deenergized will break the previously described circuits for windings 71 and 72 and will establish the following circuit for auxiliary winding 73: pole 80, contact 83, relay contact 90, conductor 96, winding 73, the pole of switch 95, conductor 97, contact 82 to pole 79. The motor will then operate at its running speed as a single phase motor rather than a polyphase motor and at a different speed particularly determined by winding 73.

It will be apparent that the motor may be operated at its running speed from either windings 74 or 75 in the same manner by an appropriate positioning of the switch 95. The operation of the motor from either of these windings will be substantially the same as that described for winding 73. In other words, the motor will always start as a polyphase motor and when the speed for which centrifugal switch 77 is set to open is reached, the motor will be shifted from the polyphase windings to one of the single phase windings for operation of the motor as a single phase motor.

In the embodiment shown in FIG. 4, terminals 100, 101 and 102 are adapted to be connected to a three-phase power line. Terminal 100 is connected by a conductor 103 to a pole 104 of a switch 105. Switch 105 is a three-pole double-throw switch and in the present embodiment provides the instantly reversing feature. Terminal 101 is connected by a conductor 106 to a pole 107 of switch 105. Terminal 102 is connected by a conductor 108 to an armature contact of relay 109. The cooperating fixed contact of that armature is designated 110. Relay 109 further carries an armature contact which alternatively engages fixed relay contacts 111 and 112. In the deenergized condition of relay 109, the armature contacts engage fixed contacts 110 and 112 and in the energized condition contacts 110 and 112 are disconnected from their associated armature contacts and fixed contact 111 is engaged by its associated armature contact. Relay contact 110 is connected by conductor 113 to one end of a motor winding 114. Relay contact 111 is connected by conductor 115 in parallel to one end of each of a plurality of auxiliary windings 116, 117 and 118. Relay contact 112 is connected by conductor 119 to one end of another motor winding 120. The other ends of the windings 114 and 120 are interconnected to one end of a third motor winding 121 in the usual manner. The other end of the winding 121 is connected by conductor 122 to contact 123 or switch 105. The other ends of the auxiliary windings 116, 117 and 118 are adapted to be selectively connected to the pole of a single-pole four-position switch 124. The pole of switch 124 is connected by a conductor 125 to the armature contact of relay 109 which is associated with fixed relay contact 110.

The conductor 125 provides a common electrical connection of three other elements in the present embodiment. The first is one side of the coil of relay 109, the second is one side of a centrifugal switch 126 and the third is the pole of a motor direction responsive switch 127. The other side of the coil of relay 109 and the other side of the centrifugal switch 126 are connected to a conductor 128. One end of conductor 128 terminates at the first contact of the switch 124. The other end of conductor 128 is connected to a pole 129 of switch 105. One end of a resistor 130 is also connected to conductor 128. The other end of the resistor 130 is connected to the armature contact of relay 109 which is associated with relay contacts 111 and 112, and is connected by conductor 131 to switch contact 132 of switch 105.

The direction sensing switch 127 is substantially the same as the previously described direction sensing switch 35 and includes contacts 133 and 134. The contacts 133 and 134 are alternatively engaged by the pole of switch 127 dependent upon the direction of rotation of the motor. Contact 133 is connected by a conductor 135 to a contact 136 of switch 105. Contact 134 of switch 127 is connected by a conductor 137 to a contact 138 of switch 105. The contact 123 of switch 105 is directly connected to contact 139 of that switch, and contact 132 is directly connected to a contact 140 of that switch. Switch 105 is so arranged that in one operated position of the switch, pole 107 engages contact 139, pole 104 engages contact 140 and pole 129 engages contact 138, and in the other operated position of the switch, pole 107 engages contact 132, pole 104 engages contact 123 and pole 129 engages contact 136.

As the hereinafter described operation will show, the embodiment of FIG. 4 will always begin its operation as a polyphase motor which selectively may be changed to run either as a polyphase motor at one speed or as a single phase motor at three different speeds. The instantly reversing feature forms an important portion of this embodiment and the reversing torque for that feature is always supplied by the three-phase windings.

Assuming first that the switches 105 and 127 are in the operated positions shown in the drawing, and that the switch 124 is adjusted so that the pole engages the first contact of that switch, the following circuits are completed: first, from terminal 100, conductor 103, pole 104 of switch 105, contact 140, contact 132, conductor 131, relay contact 112, and conductor 119 to one end of winding 120; secondly, from terminal 101, conductor 106, pole 107 of switch 105, contact 139, contact 123, and conductor 122 to winding 121; and thirdly, from terminal 102, conductor 108, relay contact 110, and conductor 113 to winding 114. At this time resistor 130 is also connected across terminals 100 and 102. However, the resistor will have no appreciable effect upon the voltage developed across the windings 120 and 114 since the resistance of the resistor 130 is relatively high. The motor will then start and run from the three phase windings 121, 120 and 114. The relay 109 of course is deenergized during such operation because it is short circuited by the centrifugal switch 126 and the switch 124. The opening of the centrifugal switch 126 when the motor reaches the speed for which the switch is adjusted will have no effect upon the three phase operation since the switch 124 in the first position maintains a shunt across the centrifugal switch 126.

The motor may be reversed in its direction of rotation by manual operation of the switch 105 from the position shown in FIG. 4 to its other operated position wherein the poles 107, 104 and 129 respectively engage contacts 132, 123 and 136. In that operated position of the switch 105 the following circuits are completed: first, from terminal 100, conductor 103, pole 104, contact 123, and conductor 122 to winding 121; and second, from terminal 101, conductor 106, pole 107, contact 132, conductor 131, relay contact 112, and conductor 119 to winding 120. Terminal 102 obviously remains connected to winding 114. Negative or reverse torque will then be applied to the motor causing it to slow down, stop and begin operation in the reverse direction. Upon the reverse operation of the motor, the direction sensing switch 127 will be operated to remove the connection of its pole from contact 133 to engagement with contact 134. The operation of the direction sensing switch 127 is, however, of no importance when the motor is operated solely as a three phase motor.

For operation of the motor when the switch 124 is shifted to its second position, with its pole engaging auxiliary winding 116, the three previously described circuits for windings 121, 120 and 114 will cause the motor to start as a three phase motor. When the motor reaches the speed for which centrifugal switch 126 is set to open, that switch will open to remove the shunt across the coil of relay 109, and relay 109 will then be energized over the following circuit: from terminal 100, conductor 103, pole 104 of switch 105, contact 140, contact 132, conductor 131, resistor 130, the coil of relay 109, conductor 125, and conductor 108 to terminal 102. In energizing, the relay 109 will break the circuits for the three phase windings at relay contacts 110 and 112 and will establish the following circuit for running the motor from winding 116: from terminal 100, conductor 103, pole 104 of switch 105, contact 140, contact 132, conductor 131, relay contact 111, conductor 115, auxiliary winding 116, the pole of switch 124, conductor 125, and conductor 108 to terminal 102. The motor will then operate as a single phase motor at a running speed determined by the number of poles of winding 116.

When it is desired to reverse the operation of the motor while it is running as a single phase motor from the auxiliary winding 116, it is merely necessary to operate the switch 105 from the position shown to its other operated position wherein the poles 107, 104 and 129 respectively engage contacts 132, 123 and 136. That operation of the switch 105 will complete the following circuit which places a shunt across the coil of relay 109: from one side of the coil of relay 109, conductor 128, pole 129 of switch 105, contact 136, conductor 135, contact 133 and the pole of direction sensing switch 127, and conductor 125 to the other side of the coil of relay 109. This shunt will cause relay 109 to be deenergized, breaking the previously described circuit for winding 116 and establishing the first described circuits for the windings 121, 120 and 114 which will apply a negative or reversing torque to the motor. This reverse torque will cause the motor to slow down, and when the speed for which centrifugal switch 126 is set to close is reached, that switch will close completing its shunt circuit across the coil of relay 109. After the motor comes to a stop and begins operation in the reverse direction, the direction sensing switch 127 will operate to cause the pole to disengage contact 133 and engage contact 134. This operation of switch 127 will break the previously described shunt involving the contact 133 from across the coil of relay 109. The motor will then gain speed in the reverse direction as a three phase motor and upon reaching the speed for which the centrifugal switch 126 is set to open, that switch will open, removing the shunt effected by that switch from across the coil of relay 109. Relay 109 will then be energized over the following circuit: from terminal 101, conductor 106, pole 107 of switch 105, contact 132, conductor 131, resistor 130, the coil of relay 109, conductor 125, and conductor 108 to terminal 102. Relay 109 upon being energized will break the circuits for the three phase windings 121, 120 and 114 and will establish the following circuit for running of the motor as a single phase motor from winding 116: from terminal 101, conductor 106, pole 107 of switch 105, contact 132, conductor 131, relay contact 111, conductor 115, winding 116, the pole of switch 124, conductor 125, and conductor 108 to terminal 102. The motor may easily again be reversed in direction of rotation by merely returning the switch 105 to the initially described operated condition. With a returning of the switch 105 to that position, the following shunt circuit across the coil of relay 109 is completed: from one side of the coil of relay 109, conductor 128, pole 129 of switch 105, contact 138, conductor 137, contact 134 of direction sensing switch 127, the pole of switch 127, and conductor 125 to the other side of the coil of relay 109. Again, relay 109 will be deenergized, disconnecting the single phase winding 116 and reestablishing the circuits for the three-phase windings 121, 120 and 114. Again reverse torque will be applied by the three-phase windings to bring the motor to a stop and re-start it in the other direction from the three phase windings.

It will be apparent from the drawing that the motor may be operated from the other single phase auxiliary windings 117 and 118 in a manner similar to that described for winding 116, it merely being necessary to operate the switch 124 to either the third or fourth positions thereof. From the foregoing it may be seen that this embodiment of the present invention comprises a motor which will always start as a three phase motor and in which the reversing torque will also always be supplied by the three phase windings. The motor may selectively be run at one speed as a three phase motor or at any one of three other speeds as a single phase motor. Further, the motor may be instantly and easily reversed in its direction of rotation.

In the following description of the embodiment shown in FIG. 5, the elements thereof which are substantially the same as those of FIG. 4 are designated with the same numerals. The basic differences between these two embodiments are, first, that the relay 109 in FIG. 5 is not directly energized from the line terminals but from a coil which is inductively coupled to the windings 120, 116, 117 and 118, and secondly, the reversing switch 105 of FIG. 4 is replaced in FIG. 5 by a different switch and multiple relay arrangement. This switch and relay arrangement comprises a double-pole double-throw switch 142 and relays 143 and 144. Each of the relays 143 and 144 is constructed with the armature thereof carrying three sets of normally open relay contacts. Relay 143 is provided with three stationary contacts 145, 146 and 147. The armature contact associated with contact 145 is connected to a conductor 148, the armature contact associated with contact 146 is connected to a conductor 149, and the armature contact associated with contact 147 is connected to a conductor 150. Relay 144 comprises three fixed contacts 151, 152 and 153. The armature contact associated with contact 151 is connected to conductor 148, the armature contact associated with contact 152 is connected by a conductor 154 to conductor 149, and the armature contact associated with contact 153 is connected by a conductor 155 to conductor 150. Energization of each of the relays 143 or 144 causes engagement of each armature contact with its associated fixed contact. Contact 145 of relay 143 is connected by a conductor 156 to line terminal 102, contact 146 is connected by a conductor 157 to line terminal 101, and contact 147 is connected by a conductor 158 to line terminal 100. Contact 151 of relay 144 is connected by a conductor 159 to conductor 156, contact 152 is connected by a conductor 160 to conductor 158, and contact 153 is connected by a conductor 161 to conductor 157.

Poles 162 and 163 of switch 142 are connected by a conductor 164 to conductor 156. Pole 162 alternatively engages contacts 165 and 166, while pole 163 alternatively engages contacts 167 and 168. Contact 168 is connected by a conductor 169 to one side of the coil of relay 144. The other side of the coil of relay 144 is connected by a conductor 170 to conductor 157. One side of the coil of relay 143 is connected by a conductor 171 to conductor 157, and the other side of the coil of relay 143 is connected to contact 167 of switch 142. Thus, when the pole 163 engages contact 168, the coil of relay 144 is energized from terminals 102 and 101, and when the pole 163 engages contact 167, the coil of relay 143 is energized from the same two terminals.

Contact 166 of switch 142 is connected by a conductor 173 to contact 133 of the direction sensing switch 127. Contact 165 of switch 142 is connected by a conductor 174 to contact 134 of the switch 127. Conductor 148 which is connected to one of the armature contacts of each of relays 143 and 144 is also connected to the armature contact of relay 109, which is adapted to engage relay contact 110 when the relay 109 is deenergized. Conductor 149 which is connected to one of the armature contacts of each of the relays 143 and 144 is also connected to winding 121. Conductor 150 which is connected to one of the armature contacts of each of relays 143 and 144 is also connected to the armature contact of relay 109, which is associated with relay contacts 111 and 112 thereof. The coil of relay 109 is adapted to be energized by voltage induced in a coil 175 in a manner similar to coil 40 of FIGS. 1 and 2. Thus, the coil of relay 109 and the coil 175 are connected by conductors 176 and 177. Conductor 177 also provides a common electrical connection for one side of the centrifugal switch 126, the pole of switch 127, and the first contact of the four-position switch 124. Conductor 176 also provides a common electrical connection for conductor 148, the other side of the centrifugal switch 126, and the pole of switch 124.

Assuming for the operation of the embodiment of FIG. 5, that switches 142 and 127 are in the positions shown in FIG. 5, and that the pole of switch 124 engages the first contact thereof, relay 143 will be energized as heretofore described and will close its contacts to complete the following circuits: first, from line terminal 100, conductor 158, relay contact 147, conductor 150, relay contact 112, and conductor 119 to winding 120; secondly, from line terminal 101, conductor 157, relay contact 146, conductor 149, to winding 121; and third, from line terminal 102, conductor 156, relay contact 145, conductor 148, relay contact 110, and conductor 113 to winding 114. The motor will then start and run from the three phase windings 121, 120 and 114. Nothing will occur when the centrifugal switch 126 opens at the speed for which it is set, since the switch 124 maintains a shunt across the coil of relay 109 to prevent any operation thereof. To next reverse the direction of rotation of the motor while operating from the three phase windings 121, 120 and 114, the switch 142 is operated to its other position, with the poles 162 and 163 respectively engaging contacts 166 and 168. This operation of the switch 142 will break the circuit for the energization of relay 143 and will complete the circuit for the energization of relay 144 as heretofore described. When relay 143 is deenergized, it will obviously break the previously described circuits for the windings 121, 120 and 114, and the energization of relay 144 will establish the following circuits supplying negative torque and running the motor in the reverse direction: first, from line terminal 100, conductor 158, conductor 160, relay contact 152, conductor 154, conductor 149, to winding 121; secondly, from line terminal 101, conductor 157 conductor 161, relay contact 153, conductor 155, conductor 150, relay contact 112, and conductor 119 to winding 120; and third, from line terminal 102, conductor 156, conductor 159, relay contact 151, conductor 148, relay contact 110, and conductor 113 to winding 114. Thus, for the three phase operation provided when the switch 124 engages the first contact thereof, all starting, running and reversing torque are supplied by the three phase windings 121, 120 and 114.

Assuming next that the switches 142 and 127 are conditioned to the positions shown in FIG. 5, and that the pole of switch 124 is positioned in engagement with the contact thereof connected to auxiliary winding 116, the previously described circuit for the energization of relay 143 is thereby completed, and relay 143 will close its contacts. The closing of the contacts of relay 143 will complete the three previously described circuits for the windings 121, 120 and 114 and the motor will start operating from those three phase windings. When the motor reaches the speed for which centrifugal switch 126 is set to open, the shunt across the coil of relay 109 will be opened and the following circuit will be completed for the energization of relay 109: from one side of the coil of relay 109, conductor 177, coil 175, and conductor 176 to the other side of the coil of relay 109. Relay 109 is thus energized by the current induced in coil 175 from winding 120 with which the coil 175 is inductively coupled. Relay 109 in energizing will disconnect the three phase windings from the line terminals 100 and 102, and will complete the following circuit for winding 116: from line terminal 100, conductor 158, relay contact 147, conductor 150, relay contact 111, conductor 115, auxiliary winding 116, the pole of switch 124, conductor 176, conductor 148, relay contact 145, and conductor 156 to line terminal 102. With the disconnection of winding 120 and the connection of winding 116, the inductive coupling between coil 175 and winding 116 will maintain the relay 109 energized. The motor will then run as a single phase motor at a speed determined by the number of poles of winding 116.

If the switch 142 is then operated to its other position to reverse the motor, with the poles 162 and 163 respectively engaging contacts 166 and 168, the holding circuit for relay 143 will be broken and relay 143 will be deenergized. The previously described circuit for the energization of relay 144 will then be completed and that relay will operate to close its contacts. The following shunt circuit across the coil of relay 109 will thereby be completed: from one side of the coil of relay 109, conductor 177, the pole and contact 133 of switch 127, conductor 173, contact 166, pole 162 of switch 142, conductor 164, conductor 156, conductor 159, relay contact 151 of relay 144, conductor 148, and conductor 176 to the other side of the coil of relay 109. This shunt circuit will cause relay 109 to be deenergized, opening the circuit for winding 116 at relay contact 111, and establishing the three previously described circuits for the reverse operation of the motor from windings 121, 120 and 114 at relay contacts 110 and 112. The three circuits to the windings 121, 120 and 114 have been above described as including the contacts 151, 152 and 153 of relay 144. The reverse torque then applied to the motor by the windings 121, 120 and 114 will cause the motor to slow down, and when the speed is reached for which the centrifugal switch 126 is set to close, that switch will close completing a shunt circuit across the coil of relay 109. After the motor comes to a stop and begins rotating in the reverse direction, the direction sensing switch 127 will operate to move the pole thereof from engagement with contact 133 to engagement with contact 134. Although this operation breaks the previously described shunt across the coil of relay 109, relay 109 will not again be energized because of the shunt now maintained thereacross by the centrifugal switch 126. When the motor reaches the running speed in the reverse direction for which the centrifugal switch 126 is set to open, that switch will open, removing the shunt across the coil of relay 109, and relay 109 will again be energized by the current induced in coil 175 from winding 120. The energization of relay 109 will again break the circuits for windings 121, 120 and 114, and will, at relay contact 111, complete the following circuit for winding 116: from line terminal 101, conductor 157, conductor 161, contact 153 of relay 144, conductor 155, conductor 150, relay contact 111, conductor 115, winding 116, the pole of switch 124, conductor 176, conductor 148, relay contact 151 of relay 144, conductor 159, and conductor 156 to line terminal 102. The motor will again operate as a single phase motor from winding 116, however, in the reverse direction.

The motor may again be reversed in direction of rotation merely by the operation of the switch 142 to return it to the position shown in FIG. 5. With direction sensing switch 127 now having its pole in engagement with contact 134, the following shunt circuit is completed across the coil of relay 109: from one side of the coil of relay 109, conductor 177, the pole and contact 134 of switch 127, conductor 174, contact 165, pole 162, conductor 164, conductor 156, conductor 159, contact 151 of relay 144, conductor 148, conductor 176 to the other side of the coil of relay 109. Relay 109 will be deenergized, as will relay 144, and relay 143 will be again energized to complete the previously described circuits for the windings 121, 120 and 114.

The operation of the motor from the windings for the other speeds, auxiliary windings 117 and 118, is similar to that described for winding 116, except for the different positions of the rotary switch 124. As shown in the drawing, the windings 117 and 118 are also inductively coupled to the coil 175 for holding the relay 109 energized when the motor is operated from one of these windings.

I claim:

1. An electric motor comprising main windings, an auxiliary winding, switch means responsive to motor speed and operable at a predetermined speed, means for shifting from said main windings to said auxiliary winding in response to operation of said switch means, means for inoperable, reversing means operable to condition said main windings to operate said motor in a reverse direction, and said shifting means being operable in response to the operation of said reversing means for shifting from said auxiliary winding to said main windings for applying a reverse torque to stop the motor.

2. An electric motor as defined in claim 1, wherein said switch means cooperates with said reversing means to start the motor in a reverse direction, and said shifting means is operable in response to operation of said switch mean, when the motor is operating in said reverse direction, to shift from said main windings to said auxiliary winding.

3. An electric motor comprising main windings, an auxiliary winding, switch means responsive to motor speed and operating at a predetermined speed, relay means including relay contacts associated with said main windings and said auxiliary winding for shifting from said main windings to said auxiliary winding in response to operation of said switch means, and means for rendering said relay means selectively operable and inoperable, said switch means comprising switch contacts adapted to open at a predetermined speed and thereby effect operation of said relay means, said relay means comprising a relay coil associated with said switch contacts and operable to shift said relay contacts from said main winding to said auxiliary winding in response to the opening of said switch contacts.

4. An electric motor comprising a plurality of main windings, a plurality of auxiliary windings, switch means responsive to motor speed and operating at a predetermined speed, means for selecting one of said auxiliary windings, means for shifting from said main windings to the selected one of said auxiliary windings in response to operation of said switch means, means for rendering said shifting means selectively operable and inoperable, reversing means operable to condition said main windings to operate said motor in a reverse direction, and means operable in response to the operation of said reversing means for shifting from said selected one of said auxiliary windings to said main windings for applying a reverse torque to stop the motor.

5. An electric motor as defined in claim 4, wherein said switch means cooperates with said reversing means to start the motor in the reverse direction, and said shifting means is operable in response to operation of said switch means, when the motor is operating in said reverse direction, to shift from said main windings to a selected one of said auxiliary windings.

6. An electric motor comprising a plurality of windings, first switch means operable to two positions to alternatively connect certain of said windings as starting windings and a certain other of said windings as a running winding, second switch means including switch contacts and operable in response to a predetermined motor speed to open said switch contacts above said predetermined motor speed and to close said switch contacts below said predetermined motor speed, means responsive to the closed condition of said switch contacts for operating said first switch means to connect said certain of said windings as starting windings and responsive to the open condition of said switch contacts for operating said first switch means to connect said certain other of said windings as a running winding, means for rendering said last mentioned means inoperable to operate said first switching means to connect said certain of other said windings as a running winding, reversing means operable to condition said certain of said windings to operate said motor in a reverse direction, and means operable in response to the operation of said reversing means to shunt said switch contacts and thereby render said certain other of said windings inoperable and said certain of said windings operable to apply a reverse torque to the motor.

7. An electric motor as defined in claim 6, wherein said means for operating said first switching means comprises a relay connected to said switch contacts.

8. An electric motor as defined in claim 6, including a plurality of windings operable selectively as running windings, said first switch means being operable when in one position to connect a selected one of the windings operable as running windings, and means for pre-selecting one of the windings operable as running windings for connection by said first switch means.

9. An electric motor comprising main windings, an auxiliary winding, circuit means operable to shift from said main windings to said auxiliary winding, relay means operable to operate said circuit means, means for energizing said relay means to effect shifting from said main windings to said auxiliary winding, and switch means responsive to motor speed and operable at a predetermined motor speed to render said energizing means operable to energize said relay means, said energizing means comprising a coil inductively coupled to said main winding and said auxiliary winding.

10. An electric motor comprising main windings, an auxiliary winding, circuit means operable to shift from said main windings to said auxiliary winding, relay means operable to operate said circuit means, means for energizing said relay means to effect shifting from said main windings to said auxiliary winding, and switch means responsive to motor speed and operable at a predetermined motor speed to render said energizing means operable to energize said relay means, means for maintaining said relay means energized when said circuit means shifts from said main windings to said auxiliary winding, said maintaining means comprising a coil inductively coupled to said auxiliary winding.

11. An electric motor as defined in claim 9, wherein said switch means comprises a shunt across said coil and means for opening said shunt at said predetermined motor speed.

12. An electric motor comprising main windings, an auxiliary winding, circuit means operable to shift said motor from said main windings to said auxiliary winding, relay means operable to operate said circuit means, means for energizing said relay means, switch means responsive to motor speed and operable at a predetermined motor speed to control the operation of said energizing means, reversing means operable to condition said main windings to operate said motor in a reverse direction, and means operable in response to the operation of said reversing means for disabling said energizing means.

13. An electric motor comprising a pair of single phase windings and a condenser for splitting the phase between said windings, an auxiliary winding, circuit means operable to connect said pair of windings and said condenser for starting and to connect one of said pair of windings for running said motor, switch means responsive to motor speed and operable when the motor is operating below a predetermined speed for operating said circuit means to start said motor and operable when the motor is operating above said predetermined speed for operating said circuit means to run said motor, means for shifting from said one winding to said auxiliary winding in response to the operation of said switch means when the motor is operating above said predetermined speed, means for rendering said shifting means selectively operable and inoperable, reversing means operable to condition said pair of windings and said condenser to operate said motor in a reverse direction, and means operable in response to the operation of said reversing means for disabling said shifting means.

14. An electric motor as defined in claim 13, wherein said shifting means comprises a relay connected in parallel with a coil, said coil being inductively coupled to said pair of windings and said auxiliary winding for energizing said relay.

15. An electric motor as defined in claim 14, wherein said switch means comprises a pair of switch contacts and means responsive to motor speed to close said switch contacts below said predetermined motor speed and to open said switch contacts above said predetermined motor speed, and second circuit means connecting said coil to said switch contacts.

16. A single phase motor comprising a pair of windings adapted to be connected to a supply line, switch means responsive to motor speed for connecting both of said pair of windings to the supply line when the motor is operating below a predetermined speed and to disconnect one of said windings from the supply line when the motor is operating above said predetermined speed, an auxiliary winding, relay means for disconnecting said pair of windings from the supply line and for connecting said auxiliary winding to the supply line, means connecting said relay means to said switch means for energizing said relay means when the motor is operating above said predetermined speed, and means for maintaining said relay means energized when the latter disconnects said pair of windings from the supply line and connects said auxiliary winding to said supply line.

17. A single phase motor as defined in claim 16, wherein said connecting means includes a manually operable switch adapted to be opened to prevent energization of said relay means.

18. A single phase motor as defined in claim 16, wherein said maintaining means comprises a coil inductively coupled to said auxiliary winding.

19. A single phase motor as defined in claim 18, wherein said relay means includes a relay coil having connections at its ends to the ends of said inductively coupled coil, and said connecting means is connected to said connections.

20. A single phase motor as defined in claim 19, including a manually operable switch mounted in said connecting means between said connections and said switch means.

References Cited in the file of this patent

UNITED STATES PATENTS

| | | |
|---|---|---|
| 1,961,793 | Schaefer | June 5, 1934 |
| 2,269,069 | Werner | Jan. 6, 1942 |
| 2,726,362 | Busch | Dec. 6, 1955 |
| 2,743,406 | London | Apr. 24, 1956 |
| 2,774,924 | Witt | Dec. 14, 1956 |
| 2,847,629 | Schaefer | Aug. 12, 1958 |

UNITED STATES PATENT OFFICE
CERTIFICATE OF CORRECTION

Patent No. 3,163,810                        December 29, 1964

Edward J. Schaefer

It is hereby certified that error appears in the above numbered patent requiring correction and that the said Letters Patent should read as corrected below.

Column 13, line 38, after "for" insert -- rendering said shifting means selectively operable and --.

Signed and sealed this 10th day of August 1965.

(SEAL)
Attest:

ERNEST W. SWIDER
Attesting Officer

EDWARD J. BRENNER
Commissioner of Patents